US012579594B1

(12) United States Patent
Browder et al.

(10) Patent No.: US 12,579,594 B1
(45) Date of Patent: Mar. 17, 2026

(54) SYSTEMS AND METHODS FOR DYNAMICALLY UPDATING DATA FOR COURSE GENERATION

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,639

(22) Filed: Nov. 22, 2024

(51) Int. Cl.
    *G06Q 50/20* (2012.01)
    *G06F 16/951* (2019.01)
    *G06F 40/284* (2020.01)
    *G06F 40/30* (2020.01)
    *G06Q 30/018* (2023.01)

(52) U.S. Cl.
    CPC ......... *G06Q 50/205* (2013.01); *G06F 16/951* (2019.01); *G06F 40/284* (2020.01); *G06F 40/30* (2020.01); *G06Q 30/018* (2013.01)

(58) Field of Classification Search
    CPC ............................ G06Q 50/205; G06F 16/951
    See application file for complete search history.

(56) References Cited

U.S. PATENT DOCUMENTS

| | | | |
|---|---|---|---|
| 12,061,970 B1 * | 8/2024 | Lo ............................ | G06N 3/10 |
| 2004/0139053 A1 * | 7/2004 | Haunschild ............ | G06Q 10/10 |
| 2013/0041882 A1 * | 2/2013 | Brodsky ............. | G06F 16/9532 |
| | | | 707/E17.108 |
| 2014/0365239 A1 * | 12/2014 | Sadeghi .................. | G16H 50/20 |
| | | | 705/3 |
| 2017/0103486 A1 * | 4/2017 | Cai ......................... | G06F 40/30 |
| 2020/0335224 A1 * | 10/2020 | Sreenivasan ........... | G16H 40/20 |
| 2021/0182926 A1 * | 6/2021 | Acharya ............ | G06Q 30/0607 |
| 2023/0015090 A1 | 1/2023 | Sharpe et al. | |
| 2024/0020480 A1 * | 1/2024 | Sharpe .................. | G06F 40/205 |

FOREIGN PATENT DOCUMENTS

WO    WO-2024194863 A1 *  9/2024

* cited by examiner

*Primary Examiner* — Jessica Lemieux
*Assistant Examiner* — Alaa Wadie Hussein
(74) *Attorney, Agent, or Firm* — CALDWELL LLC

(57) ABSTRACT

A system for dynamically updating data for course generation, the system including a web crawler operating on a server, wherein the web crawler is configured to identify one or more predetermined HTML elements on a plurality of web pages, identify isolated data as a function of the one or more predetermined HTML elements, compare the isolated data to a modification baseline and generate regulatory data as a function of the isolated data and the comparison, and a memory the memory containing instructions configuring at least a processor to receive the regulatory data, classify the regulatory data to one or more guideline categorizations, identify a plurality of course modules, modify the one or more course modules as a function of the regulatory data and transmit a notification associated with the one or more modified course modules to an end user.

16 Claims, 8 Drawing Sheets

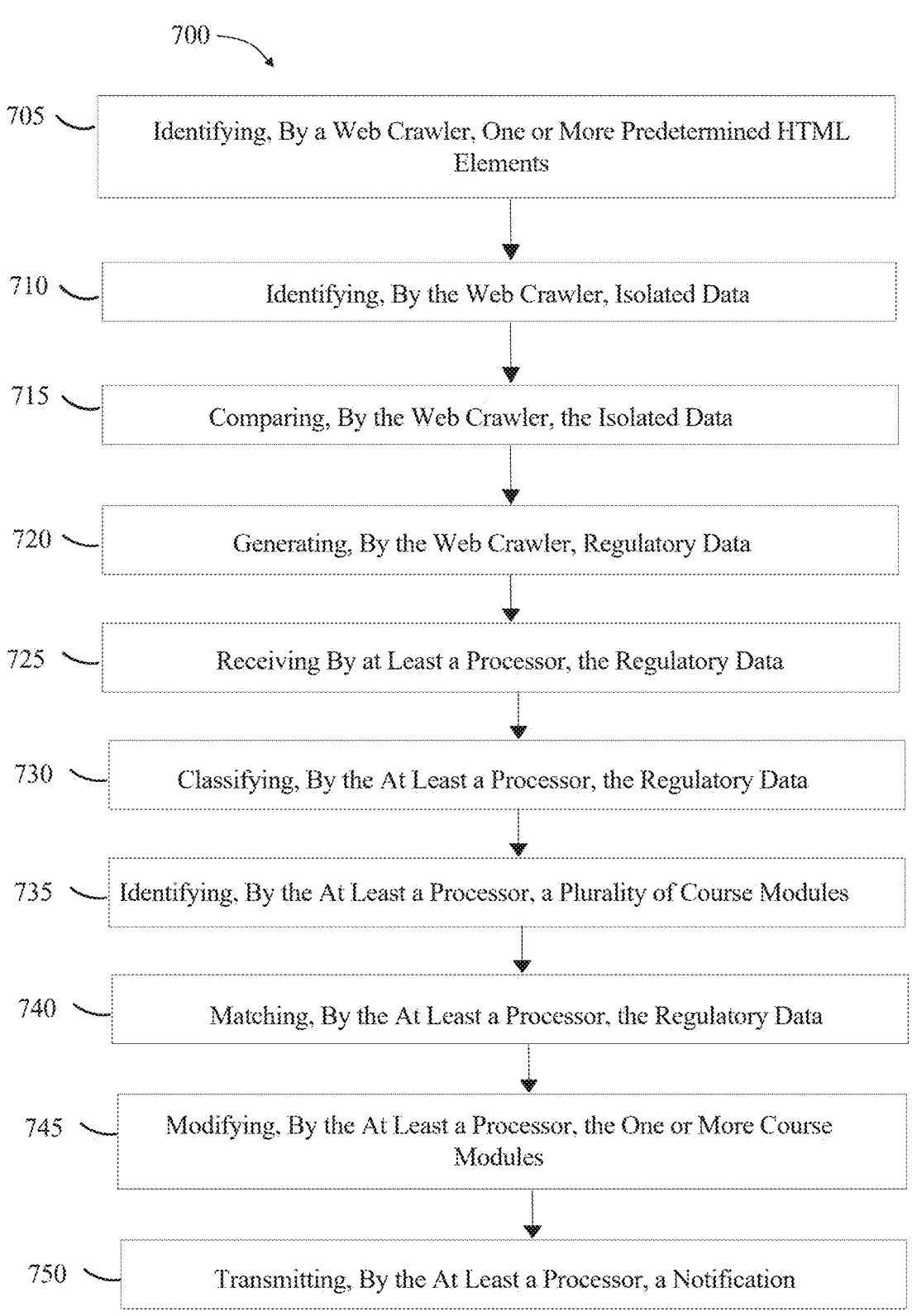

700

705 — Identifying, By a Web Crawler, One or More Predetermined HTML Elements

710 — Identifying, By the Web Crawler, Isolated Data

715 — Comparing, By the Web Crawler, the Isolated Data

720 — Generating, By the Web Crawler, Regulatory Data

725 — Receiving By at Least a Processor, the Regulatory Data

730 — Classifying, By the At Least a Processor, the Regulatory Data

735 — Identifying, By the At Least a Processor, a Plurality of Course Modules

740 — Matching, By the At Least a Processor, the Regulatory Data

745 — Modifying, By the At Least a Processor, the One or More Course Modules

750 — Transmitting, By the At Least a Processor, a Notification

FIG. 7

SYSTEMS AND METHODS FOR DYNAMICALLY UPDATING DATA FOR COURSE GENERATION

FIELD OF THE INVENTION

The present invention generally relates to the field of course generation. In particular, the present invention is directed to dynamically updating data for course generation.

BACKGROUND

The generation of educational courses, particularly in use with large language models, require accurate and up to date information in order to properly create and update courses regularly. If data is not properly filtered, educational courses may contain irrelevant information, and as a result, become useless. Current systems utilized for course generation do not contain the capabilities to property filter out unnecessary data. In addition, current systems utilized for course generation may require a vast amount of computational power, thus resulting in a less efficient system.

SUMMARY OF THE DISCLOSURE

In an aspect, a system for dynamically updating data for course generation is described. the system includes a web crawler operating on a server, wherein the web crawler is configured to identify one or more predetermined HTML elements on a plurality of web pages, identify isolated data as a function of the one or more predetermined HTML elements, compare the isolated data to a modification baseline and generate regulatory data as a function of the isolated data and the comparison. The system further includes at least a processor, and a memory communicatively connected to the at least a processor. The memory contains instructions configuring the at least a processor to receive the regulatory data, classify the regulatory data to one or more guideline categorizations, identify a plurality of course modules, wherein each course module is associated with at least one guideline, match the regulatory data to one or more course modules as a function of the one or more guideline categorizations, modify the one or more course modules as a function of the regulatory data and transmit a notification associated with the one or more modified course modules to an end user.

In another aspect, a method for dynamically updating data for course generation is described. The method includes identifying, by a web crawler operating on a server, one or more predetermined HTML elements on a plurality of web pages, identifying, by the web crawler, isolated data as a function of the one or more predetermined HTML elements, comparing, by the web crawler, the isolated data to a modification baseline and generating, by the web crawler, regulatory data as a function of the isolated data and the comparison. The method further includes receiving, by at least a processor, the regulatory data, classifying, by the at least a processor, the regulatory data to one or more guideline categorizations, identifying, by the at least a processor, a plurality of course modules, wherein each course module is associated with at least one guidelines, matching, by the at least a processor, the regulatory data to one or more course modules as a function of the one or more guideline categorizations, modifying, by the at least a processor, the one or more course modules as a function of the regulatory data and transmitting, by the at least a processor, a notification associated with the one or more modified course modules to an end user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a flow diagram illustrating an exemplary embodiment of a method for dynamically updating data for course generation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dynamically updating data for course generation. In an embodiments, aspects of the present disclosure include a web crawler configured to identify HTML elements, identify isolated data, compare the isolated data to a modification baseline and generate regulatory data. Aspects of the present disclosure further include a processor configured to modify course modules as a function of the regulatory data and notify end users of the modifications.

Aspects of the present disclosure can be used to parse multiple web page and dynamically retrieve new information without worrying that other ancillary information will be parsed as well. Aspects of the present disclosure can also be used to generate education courses based on changes in medical regulations. Exemplary embodiments illustrating aspects of the present disclosure are described below in the context of several specific examples.

Figure 1:
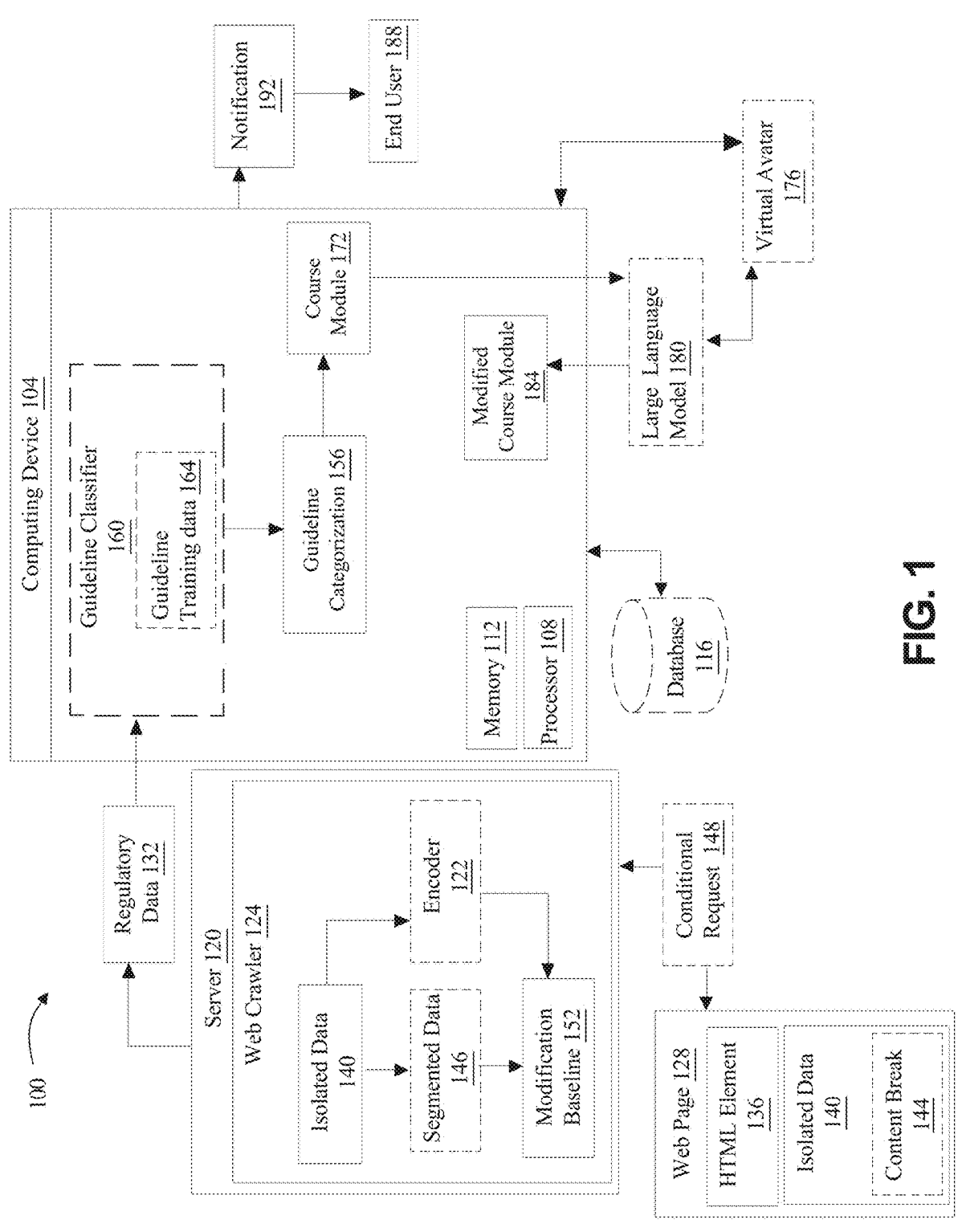
FIG. 1 is a block diagram of an exemplary embodiment of a system for dynamically updating data for course generation.

Referring now to FIG. 1, a system 100 for dynamically updating data for course generation is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for inter-communication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server 120, such as but not limited to, a remote server, a cloud server, a network server and the like. In one or more embodiments. In one or more embodiments, computing device 104 may be configured to transmit one or more processes to be executed by server 120. In one or more embodiments, server 120 may contain additional and/or increased processor power wherein one or more processes as described below may be performed by server 120. For example, and without limitation, one or more processes associated with machine learning may be performed by network server, wherein data is transmitted to server 120, processed and transmitted back to computing device. In one or more embodiments, server 120 may be configured to perform one or more processes as described below to allow for increased computational power and/or decreased power usage by system computing device 104. In one or more embodiments, computing device 104 may transmit processes to server 120 wherein computing device 104 may conserve power or energy.

With continued reference to FIG. 1, one or more processes as described in this disclosure may be performed by server 120. In one or more embodiments, processor 108 may communicate with server 120 to receive information needed for one or more instructions tasked by processor 108. In one or more embodiments, server may include one or more systems and/or software configured to provide information and/or data to processor 108.

With continued reference to FIG. 1, system 100 includes a web crawler 124 operating on server 120. A "web crawler," as used herein, is a program that systematically browses the internet for the purpose of Web indexing. The web crawler 124 may be seeded with platform URLs, wherein the crawler may then visit the next related, retrieve the content, index the content, and/or measures the relevance of the content to the topic of interest. In some embodiments, computing device may generate web crawler 124 to compile data for use by processor 108. The web crawler 124 may be seeded and/or trained with websites, such as governmental and/or medical websites associated with medical or guidelines. This may include, but is not limited to, websites relating to the regulation of medication, websites related to the regulation of medical treatments, websites relating to the regulation of medical care, research websites indicating new findings and/or the like. Web crawler 124 may be generated by computing device. In some embodiments, the web crawler 124 may be trained with information received from a user through a user interface. In some embodiments, the web crawler 124 may be configured to generate a web query. A web query may include search criteria received from a user. For example, a user may submit a plurality of websites for the web crawler 124 to search to extract any data suitable for system data.

With continued reference to FIG. 1, web crawler 124 may include a software defined to systematically browse the web in order to retrieve and index information. In one or more embodiments, web crawler 124 may started with a list of seeded URLs, wherein the seeded URLs include initial web pages 128 to visit. In one or more embodiments, web crawler 124 may be configured to retrieve any information listed within seeded URLs. In one or more embodiments, Web crawler 124 may further be configured to parse an HTML of the web pages 128 to extract the content of the web pages 128 as well as additional links used for content extraction. In one or more embodiments, information retrieved by the web crawler 124 may be stored in database 116. In one or more embodiments, database 116 may include a web crawler database as described in reference to at least FIG. 6. In one or more embodiments, web crawler 124 may include a crawl depth, wherein the crawl depth determines how far the web crawler 124 will go from the seeded URLS. In one or more embodiments, web crawler 124 may include a crawl frequency, wherein the crawl frequency determines how often web crawler 124 should identify and retrieve information from the seeded URLs. In one or more embodiments, Web crawler 124 may use HTTP requests in order to fetch web pages 128 in order to extract content from the web pages 128.

With continued reference to FIG. 1, web crawler 124 is configured to generate and/or retrieve regulatory data 132 and/or information associated with regulatory data 132. "Regulatory data" for the purposes of this disclosure refers to information pertaining to rules and guidelines established by a regulatory body. For example, and without limitation, regulatory data mya include rules and guidelines established by governmental and regulatory bodies to ensure the safety, efficacy, and ethical standards of medical products, services, and practice. In another non-limiting example, and without limitation regulatory data 132 may include instructions for medical professionals to wash their hands prior to a medical procure. In one or more embodiments, regulatory data 132 may include any guidelines set by governmental and/or regulatory medical organizations that relate patient medical care and/or patient medical attention. In one or more embodiments, regulatory data 132 may include treatment options, medication dosing of treatments, recommended treatment options, alternative treatment options, cardio related activities, nutrients to consume and/or the like. In one or more embodiments, regulatory data 132 may include adverse events reports, guidelines and protocols, safety information, labeling information, regulatory compliance records, patient education records generated by regulatory agencies, quality assurance information and/or the like. In one or more embodiments, regulatory data 132 may include any information that is reasonably necessary for a medical professional to make an informed decision pertaining to medical care.

With continued reference to FIG. 1, web crawler 124 may be seeded with a plurality of websites or web pages 128 of governmental entities and/or regulatory bodies. In one or more embodiments, regulatory bodies may include but are not limited to, agencies such as The Joint Commission (TJC), Centers for Medicare and Medicaid services (CMS), National Health service (NHS) Regulators, The Food and Drug administration (FDA), the Health Resources and services Administration (HRS) and/or the like. In one or more embodiments, information associated with regulatory bodies may be located on web pages such as FDA.gov, NCQA.gov, HRSA.gov and/or the like. In an embodiment, an individual associated with system 100 may seed web crawler 124 with a plurality of web pages 128 that are known to be accurate and/or trusted for use by medical professional. In one or more embodiments, web crawler 124 is configured to receive a plurality of web pages 128 to extract content from. In one or more embodiments, web pages 128 may be received in the form of seeded URLs. In one or more embodiments, web crawler 124 may configured to receive a plurality of URLS pertaining to web pages 128 that require extraction of content.

With continued reference to FIG. 1, web crawler 124 is configured to identify one or more predetermined HTML elements 136 on each web page 128 of a plurality of web pages 128. An "HTML element" for the purposes of this disclosure refers to a component of a web pages 128 HTML structure that defines the content, layout and functionality of the structure. For example, and without limitation, HTML element 136 may include a heading wherein the heading indicates the central theme or title of a web pages 128 content. In one or more embodiments, HTML elements 136 may include code and/or instructions indicating the particular content that is being described. For example, and without limitation, "<p>" may indicate a paragraph wherein the paragraph is most typically associated with the primary content of the web page 128. In one or more embodiments, HTML elements 136 may include elements such as but not limited to, <p>, <div>, <span>, <a>, <h1>, <h2> and/or the like. In one or more embodiments, HTML elements 136 may specify the particular type of content on a webpage, such as but not limited to, links, paragraphs, headers, textual content, images, tables, articles, scripts, metadata, and/or the like. In one or more embodiments, web crawler 124 may be configured to identify predetermined HTML elements 136, wherein predetermined HTML elements 136 include HTML elements 136 that have been previously selected and determined to contain relevant information. For example, and without limitation, predetermined HTML element 136 may include "<p>" wherein predetermined HTML element 136 may include identification of paragraphs on web pages 128. In one or more embodiments, web crawler 124 may configured to identify predetermined or preselected HTML elements 136 and extract content associated with the predetermined HTML elements 136. In one or more embodiments, predetermined HTML elements 136 may indicate the particular information that should be extracted from each web page 128. In one or more embodiments, web crawler 124 may be preconfigured to retrieve paragraphs, headers and/or the like while ignoring links, tables and/or the like. In one or more embodiments, predetermined HTML elements 136 may allow for web crawler 124 to retrieve content related to a web page 128 and ignore advertisements, comments by individual and/or any other extraneous information that is not relevant to the web page 128. In one or more embodiments, predetermined HTML elements 136 may allow for Web crawler 124 to extract relevant content while ignoring any ancillary content.

With continued reference to FIG. 1, web crawler 124 is configured to identify isolated data 140 as a function of the predetermined HTML elements 136. "Isolated data" for the purposes of this disclosure refers to information extracted from a web page 128 that is specific to one or more HTML elements 136. For example, and without limitation, isolated data 140 may include a paragraph of textual content on a web page 128. In one or more embodiments, isolated data 140 may include multiple set of data, wherein each set of data is associated with a particular HTML element 136. In one or more embodiments, isolated data 140 may further a heading and a following paragraph of the heading. In one or more embodiments, isolated data 140 may include textual data, whereas images are not retrieved from the web page 128. In one or more embodiments, isolated data 140 may include textual information, whereas advertisements, comments, and/or graphical elements may not be recorded by web crawler 124. In one or more embodiments, isolated data 140 may include any textual information that describes a regulations, medical treatments and/or the like. In one or more embodiments, isolated data 140 may include information that is retrieved from a web page 128, absent any images, links, hyperlinks and/or the like. In one or more embodiments, isolated may include any information retrieved from a web page 128 absent information associated with one or more HTML elements 136. In one or more embodiments, web crawler 124 may be configured to identify isolated data 140 by identifying particular HTML elements 136 and the proceeding information following the HTML elements 136.

With continued reference to FIG. 1, isolated data 140 may include content breaks 144. A "content break" for the purposes of this disclosure refers to the distinction between two sets of information as defined by their associated HTML elements 136. For example, and without limitation, a content break 144 may exist between a first paragraph and a second paragraph within isolated data 140, wherein the first paragraph is associated with a first HTML element 136 and the second paragraph is associated with a second HTML element 136. In one or more embodiments, content breaks 144 may be identified based on the presence of information associated with one or more HTML elements 136. In one or more embodiments, a content break 144 may exist, for example, between an HTML element 136 such as a header and an HTML element 136 such as a paragraph. In one or more embodiments, web crawler 124 may be configured to extract all relevant textual information within a web page 128, wherein the relevant information may be associated with multiple HTML elements 136. In one or more embodiments, web crawler 124 may be configured to identify content breaks 144 within isolated data 140 and segment isolated data 140 into a plurality of segmented data 146. "Segmented data" for the purposes of this disclosure refers to a portion of information contained within isolated data 140. For example and without limitation, isolated data 140 may include all textual information contained within a web page 128 whereas segmented data 146 may include information pertaining to a singular HTML element 136 pair and/or associated HTML elements 136 (e.g. header and paragraph). In one or more embodiments, web crawler 124 may be configured to segment isolated data 140 into a plurality of segmented data 146. In one or more embodiments, plurality of segmented data 146 may include isolated data 140 with identified content breaks 144. In one or more embodiments, web crawler 124 may be configured to extract isolated data 140 from each web page 128 and segment isolated data 140 into a plurality of segmented data 146 based on content breaks 144. In one or more embodiments, content breaks 144 may be identified based on HTML elements 136. In one or more embodiments, content breaks 144 may be identified based on new line indents, changes in paragraphs, changes in font or font size and/or the like.

With continued reference to FIG. 1, web crawler 124 may be configured to transmit a conditional request 148 to each web page 128 of a plurality of pages in order to identify isolated data 140. A "conditional request" for the purposes of this disclosure is instructions indicating to processes one or more instructions only if certain conditions are met. For example, and without limitation, conditional request 148 may include a request to retrieve information only if the information has been modified after a particular date. In one or more embodiments, conditional request 148 may include a request to receive information only if a web page 128 has been modified since a specific date and time. In one or more embodiments, conditional requests 148 may include requests to retrieve information, to retrieve specific sets of information and/or the like. In one or more embodiments, web crawler 124 may transmit conditional request 148 to a web server 120, wherein the web server 120 may return information only if the conditions of the conditional request 148 are met. A "server" for the purposes of this disclosure is a system that provides resources, data or services to other computing systems over a network. For example, and without limitation, server may include a web server, a file server, a database server, and/or the like. In one or more embodiments, conditional request 148 may include a request header. In one or more embodiments, a request header may include information about a particular conditional request 148. In one or more embodiments, request header may identify the specific web crawler 124 being used, may request for a particular set of information and/or the like. In one or more embodiments, request header may include the specific content the web crawler 124 is seeking, the specific format the web crawler 124 can accept, various compression formats that are accepted by the web crawler 124, where the request is coming from and/or the like. In one or more embodiments, web crawler 124 may transmit conditional request 148 to web pages 128 and/or web servers 120 of web pages 128. In one or more embodiments, web pages 128 may transmit a response to web crawler 124. A "response" for the purposes of this disclosure refers to information received from a web page 128 indicating compliance with a conditional request 148. For example, and without limitation response may include isolated data 140. In one or more embodiments, response may include information complying with conditional request 148, such as isolated data 140. In one or more embodiments, response may further include information indicating that the conditional request 148 could not be fulfilled. For example, and without limitation, response may indicate that no new information have been updated on a web page 128. In one or more embodiments, response may further include any and/or all information contained within web page 128 that complies with conditional request 148. In one or more embodiments, each web page 128 may be configured to transmit response to web crawler 124. In one or more embodiments, response may include a modification state of each web page 128. A "modification state" for the purposes of this disclosure is information documenting the various changes that have been made to a web page 128. For example, and without limitation, modification state may include a date and time of each added paragraph. In one or more embodiments, modification state may further include changes to various paragraphs, changes to wording, changes to web layout and/or the like. In one or more embodiments, response may include all new information contained within a web page 128, including advertisements, images, tables and/or the like. In one or more embodiments, web crawler 124 may use response to select content within isolated data 140 corresponding to predetermined HTML elements 136 that are of importance. For example, and without limitation, web crawler 124 may isolate paragraphs and/or headers within response and retrieve them as isolated data 140. In one or more embodiments, web crawler 124 may use modification state to determine which portions of response should be used for isolated data 140. In an embodiments, isolated data 140 may only include specific portions of web pages 128 that have been identified in response. In one or more embodiments, a modification state of each web page 128 may allow web crawler 124 to discern and determine which content on the web page 128 is useful and/or important. In one or more embodiments, web crawler 124 may be configured to identify predetermined HTML elements 136 within response. In one or more embodiments, web crawler 124 may be configured to identify predetermined HTML elements 136 in each response from each web page 128 and generate isolated data 140 as a result.

With continued reference to FIG. 1, web crawler 124 is configured to compare isolated data 140 to a modification baseline 152. A "modification baseline" for the purposes of this disclosure refers to a threshold which indicates if information received by web crawler 124 should be retained for further use. For example, and without limitation, modification baseline 152 may indicate a date of generation, wherein all content on a web page 128 generated before a particular web page 128 should not be retained. Continuing, modification baseline 152 may include Jan. 1, 2024, wherein information generated or placed on the web page 128 before Jan. 1, 2024, should be removed from modification baseline 152. In one or more embodiments, modification baseline 152 may include the date of the last instance in which web crawler 124 retrieved isolated data 140. In one or more embodiments, modification baseline 152 may then be used to filter out any information that may have already been retrieved on a previous iteration by web crawler 124. In one or more embodiments, modification baseline 152 may be used to determine if information extracted from a webpage has already been recorded by web crawler 124. In one or more embodiments, modification baseline 152 may be used to determine if information contained within a web page 128 has been modified or changed. In one or more embodiments, web crawler 124 may be use metadata contained within a web page 128 to identify a date and time in which information was added to a web page 128. In one or more embodiments, web crawler 124 may compare the date and time within the metadata to modification baseline 152 (e.g. such as the last time in which information was received) in order to determine if isolated data 140 should be retained. In one or more embodiments, web crawler 124 may be configured to retrieve only information on a web page 128 that has not been previously received by web crawler 124. This may include updates to existing content and/or new guidelines that have been set in place. In one or more embodiments, each segmented data 146 may be comparted to modification baseline 152 wherein metadata associated with segmented data 146 may be used to determine if segmented data 146 is relatively new or has been previously retrieved by web crawler 124.

With continued reference to FIG. 1, in one or more embodiments, modification baseline 152 may include a particular date and time wherein content of various web pages 128 published before the particular date and time may be removed from isolated data 140. In one or more embodiments, modification baseline 152 may include content and/or isolated data 140 retrieved from a preceding web crawl. A "web crawl" as described in this disclosure refers to the act of extracting content from a web page 128. In one or more embodiment, modification baseline 152 may include isolated data 140 retrieved from a previous web crawl wherein modification baseline 152 may include isolated data 140 extracted by web crawler 124 on a previous instance. In one or more embodiments, web crawler 124 may be configured to compare currently retrieved isolated data 140 to isolated data 140 from a previous web crawl in order to determine what information within isolated data 140 has already been recorded. In one or more embodiments, modification deadline may include a compiling of previous isolated data 140, wherein web crawler 124 may compare isolated data 140 to previous isolated data 140 and filter out any redundant information. In one or more embodiment, following comparison isolated data 140 may be appended to modification baseline 152 such that modification baseline 152 is updated for a subsequent web crawl.

With continued reference to FIG. 1, modification baseline 152 may include encoded data. "Encoded data" for the purposes of this disclosure refers to information that has been converted from one form to another. For example, and without limitation, encoded data may include data that has been converted from one network protocol to another. In one or more embodiments, information may be encoded to reduce storage size and/or to increase processing capabilities due to reduced storage sizes. In one or more embodiments, encoded data may include data that has been reduced in storage size due to one or more data compression techniques. This may include but is not limited to, lossless compression techniques, lossy compression techniques, removing redundant data, pattern recognition and/or the like. In one or more embodiments, encoding data may include one or more cryptographic processes as described in this disclosure.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatdn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in one or more embodiments, data may be encoded using an encoder 122. An "encoder" as described in this disclosure refers to a software component that converts data from one format to another. In one or more embodiments, encoder 122 may include a digital data encoder, a hardware encoder, a data compression encoder, a URL encoder, a machine learning encoder and/or any encoder as described in this disclosure. In one or more embodiments, encoder 122 may be operating on server 120 and/or on processor 108. In one or more embodiments, web crawler 124 may include an encoder 122, wherein web crawler 124 may encode data. In one or more embodiments, encoder 122 may be configured to encode isolated data 140 and compare encoded isolated data 140 to a modification baseline 152 having encoded data. In one or more embodiments, modification baseline 152 may be encoded wherein encoder 122 may be configured to encode isolated data 140 as well such that comparison may be achieved though two data sets having similar formats. In one or more embodiments, encoder 122 may be configured to encode isolated data 140 using UTF-8 encoding techniques. In one or more embodiments, UTF-8 may include a variable-length character encoding process that can represent every character in the Unicode character set. In one or more embodiments, encoder 122 may be configured to convert isolated data 140 into a UTF-8 format. In one or more embodiments, encoder 122 may be configured to convert isolated data 140 into a bag-of-words (BoW) format. In one or more embodiments, Bag-of-Words may include a text representation technique where a document is represented as a set of words and their frequencies, ignoring grammar and word order. In one or more embodiments encoder 122 may be configured to encode isolated data 140 using Vector quantization compression, run-length-encoding, burrows-wheeler transform (BWT) compression, delta encoding, perceptual hashing and/or the like. In one or more embodiments, encoded information within isolated data 140 and modification baseline 152 may be used for comparison in order to reduce storage consumption and/or processing power. In one or more embodiments, an encoder 122 may encode isolated data 140 and compare isolated data 140 to modification baseline 152. In one or more embodiments, modification baseline 152 may include isolated data 140 that has been previously encoded. In one or more embodiments, encoding may include a hashing process, such as any hashing process as described in this disclosure, wherein two hashes may be compared to one another. In one or more embodiments, each segmented data 146 may be hashed and compared to modification baseline 152. In an embodiments, if a header or paragraph has been previously retrieved by web crawler 124 then a similar hash may be present within modification baseline 152. In one or more embodiments, modification baseline 152 may include previously received isolated data 140 that has been converted into a plurality of hashes. In an embodiments, web crawler 124 may produce hashes for isolated data 140 and compare the hashes within isolated data 140 to hashes within modification baseline 152. In an embodiment, similar hashes may indicate that data within isolated data 140 and data within modification baseline 152 are similar and need to be filtered out. In one or more embodiments, each segmented data 146 may be encoded, wherein encoded segmented data 146 may be compared to modification baseline 152. In one or more embodiments, encoded segmented data 146 may be appended to modification baseline 152, wherein modification baseline 152 may be updated for subsequent iterations. In one or more embodiments, modification baseline 152 may include a plurality of previously received segmented data 146 that has been appended to a data set.

With continued reference to FIG. 1, encoder 122 may utilize one or more transformer architecture techniques as described in this disclosure, such as in reference to LLM as described in further detail below. In one or more embodiments, encoder may be trained through one or more representation learning techniques that map inputs into a comparable latent space. In one or more embodiments, representation learning techniques may place similar inputs close to one another while non-similar inputs are placed further apart. In one or more embodiments, training encoder 122 may include the use of classification wherein the output is a label or category. In one or more embodiments, the encoder 122 may be trained by minimizing a classification loss. In one or more embodiments, encoder 122 may be trained to learn features that may be used to distinguish between different classes allowing for the mapping of similar data points close together in a latent space. In one or more embodiments, encoder may be trained using a machine learning model such as any machine learning model as described in this disclosure. In one or more embodiments, encoder 122 may be trained to directly learn a distance or similarity metric between inputs. In one or more embodiments, encoder 122 may be trained using self-supervised learning wherein encoder 122 may be configured to predict missing words in a sentence or configured to predict context of data. In one or more embodiments, self-supervised learning may include an self-supervised learning process as described in this disclosure.

With continued reference to FIG. 1, web crawler 124 may be configured to identify least a distance metric as a function of the plurality of isolated data 140 and the modification baseline 152. For the purposes of this disclosure, a "distance metric" is a type of metric used in machine learning or encoding techniques to calculate similarity between data encodings. Common types of distance metrics may include Euclidean Distance, Manhattan Distance, Minkowski Distance, and Hamming Distance. As a nonlimiting example, a small distance metric between isolated data 140 and modification baseline 152 may indicate small changes to a previously published web page 128, whereas a large distance metric between isolated data 140 and modification baseline 152 may indicate that new information has been added. In some cases, generating at least a distance metric may include selecting one or more cutoffs, such as without limitation an absolute numerical value or a percentage, which may be used to categorize the at least a distance metric into one or more categories. In one or more embodiments, larger distance metric may indicate that content within isolated data 140 greatly differs and/or content is newly generated while little to no distance metrics may indicate small grammatical changes or miniscule changes. In one or more embodiments, distance metrics such as levenshtein distance may be used to calculate the minimum number of single-character edits required to change one string to another. This may allow system 100 and/or web crawler 124 to pinpoint exactly what changes were made. In one or more embodiments, the Levenshtein distance can be used to measure how different two text encodings are. In one or more embodiments, token-based comparisons may be used to determine which specific sequence of words or characters between two data sets have changed. In one or more embodiments, web crawler 124 and/or a software operating on server 120 may be configured to identify distance metric and determine based on distance metric similar segments of isolated data 140 and/or segmented data 146 in comparison to modification baseline 152. In one or more embodiments, documents, such as isolated data 140 may be represented as vectors wherein identifying a distance metric may include identifying a cosine similarity between isolated data 140 (and/or segmented data 146) and modification baseline 152. In one or more embodiments, cosine similarly may be used to determine that two documents, contain similar semantic meaning, but with different phrasing. This may include situations in which grammatical issues have been fixed on a web page 128, words have been changed for other words with similar meaning and/or the like.

With continued reference to FIG. 1, in one or more embodiments, distance metric thresholds may be updated based on feedback received by system 100. In an embodiment, distance metrics may be used to distinguish between new information and slight changes in information. In one or more embodiments, users may provide feedback that not all new information is captured using distance metrics wherein distance metric thresholds may require updating in order to capture slight changes within isolated data 140. In one or more embodiments, distance metric thresholds may be iteratively updated using feedback in order to ensure that all new information is properly recorded and/or retrieved.

With continued reference to FIG. 1, in one or more embodiments, web crawler 124 and/or system 100 may be configured to identify redundant elements within isolated data 140 using distance metric and/or encoded isolated data 140. A "redundant element" for the purposes of this disclosure refers to a portion of isolated data 140 that is determined to have already been extracted during a previous web crawl. For example, and without limitation, redundant element may include a treatment that had already been recorded by web crawler 124 on a preceding web crawl. In one or more embodiments, redundant element may include a single segmented data 146 from a plurality of segmented data 146. In one or more embodiments, segmented data 146 may be filtered out and/or removed if system 100 determines that information within segmented data 146 has already been retrieved by web crawler 124. In one or more embodiments, redundant elements may be identified as a function of the distance metric wherein small distance metrics may indicate that information within isolated data 140 and/or segmented data 146 may be redundant and/or previously retrieved. In one or more or more embodiments, web crawler 124 may be configured to identify redundant elements by identifying distance metrics, comparing hashes and/or the like.

With continued reference to FIG. 1, web crawler 124 is configured to generate regulatory data 132 as a function of isolated data 140 and/or the comparison of isolated data 140 to modification baseline 152. In one or more embodiments, regulatory data 132 may include isolated data 140 in which redundant elements have been filtered out. In one or more embodiments, regulatory data 132 may include new information that has been retrieved by web crawler 124 in comparison to a previous iteration. In one or more embodiments, regulatory data 132 may include information that has been retrieved by web crawler 124 and has been determined to contain new data not previously seen by system 100. In one or more embodiments, segmented data 146 not containing any redundant elements may be regrouped as regulatory data 132. In one or more embodiments, generating regulatory data 132 as a function of the isolated data 140 and the comparison includes generating the regulatory data 132 as function of the isolated data 140 and the one or more contradictory elements.

In one or more embodiments, processor 108 is configured to receive regulatory data 132. In one or more embodiments, processor 108 is communicatively connected to server 120 and/or web crawler 124 in order to receive regulatory data 132. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of system 100. Communicative connecting may also include indirect connections via, for example and without limitation, wireless connection, radio communication, low power wide area network, optical communication, magnetic, capacitive, or optical coupling, and the like.

With continued reference to FIG. 1, processor 108 is configured to classify regulatory data 132 one or one or more guideline categorizations 156. A "guideline categorization" for the purposes of this disclosure is a grouping of elements that are associated with similar patient treatments. For example, and without limitation, guideline categorization 156 may include diabetes wherein any regulatory data 132 associated with diabetes may be classified into the same grouping. In one or more embodiments, In one or more embodiments, guideline categorizations 156 may be grouped based on medical illness, patient interactions and/or the like. In an embodiments, each guideline categorization 156 may include a separate grouping for each regulatory guideline that has been identified within regulatory data 132. for example, and without limitation, a regulatory guidelines giving updates on how to treat patients with mental health issues may be grouped in one guideline categorization 156, while cardiac related disorders may be grouped into another categorization. In one or more embodiments, regulatory data 132 may be classified based on identified keywords within headers and/or paragraphs that are more likely to be associated with a particular guideline categorization 156. For example, and without limitation, words or phrases such as "insulin level" and/or "diabetes" may be categorized to a diabetes categorization. In one or more embodiments, regulatory data 132 may be split into segmented data 146 wherein each segmented data 146 may be classified to a particular guideline categorization 156. In one or more embodiments, processor 108 may use a classifier to classify regulatory data 132 and/or elements thereof to one or more guideline categorizations 156. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, Processor 108 may generate and train a guideline classifier 160 configured to receive regulatory data 132 and output at least a guideline categorization 156. Processor 108 and/or another device may generate a classifier using a classification algorithm, defined as a process whereby a Processor 108 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A guideline classifier 160 may be trained with training data correlating regulatory data 132 to guideline categorizations 156, such as, diabetes, mental health, patient interaction, heart health, cancer, and the like. Training data may be received from an external computing device, user input, and/or previous iterations of processing. A guideline classifier 160 may be configured to input regulatory data 132 and categorize components of regulatory to one or more guideline categorizations 156.

With continued reference to FIG. 1, Processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, guidelines classifier may be configured to receive regulatory data 132 and/or elements thereof as inputs and output guideline categorizations 156. In one or more embodiments, guideline classifier 160 may be generated using any classifier or machine learning model as described within this disclosure. In one or more embodiments, classifying regulatory data 132 to one or more regulatory guidelines may include guideline training data 164. Guideline training data 164 may include a plurality of regulatory data 132 correlated to a plurality of guideline categorization 156. In some cases, guideline training data 164 may be received from a user, a third party, database 116, external computing devices, previous iterations of the function and/or the like. In some embodiments, guideline training data 164 may be stored in database 116. In some embodiments, guideline training data 164 may be retrieved from a database 116. In some embodiments, regulatory data 132 may be stored in a database 116 and used as training data for future iterations. Similarly, training data may be created from previous iterations wherein a previous regulatory data 132 was received and stored on a database 116. Classifying regulatory data 132 to one or more guideline categorizations 156 may further include training guideline classifier 160 as a function of the guideline training data 164 and classifying regulatory data 132 as a function of the trained guideline classifier 160. In some embodiments, outputs of guideline classifier 160 may be used to train guideline classifier 160.

With continued reference to FIG. 1, guideline classifier 160 may include a machine learning model. Processor 108 may use a machine learning module, such as a machine learning module for the purposes of this disclosure, to implement one or more algorithms or generate one or more machine-learning models, such as an assessment machine learning model, to calculate at least one smart assessments. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database 116, such as any database 116 132 described in this disclosure, or be provided by a user. In other embodiments, a machine-learning module may obtain a training set by querying a communicatively connected database 116 132 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. A machine learning module, such as guideline module, may be used to generate guideline machine learning model and/or any other machine learning model using training data. Guideline machine learning model may be trained by correlated inputs and outputs of training data. Training data may be data sets that have already been converted from raw data whether manually, by machine, or any other method. Guideline training data may be stored in a database 116. Guideline training data may also be retrieved from database 116.

With continued reference to FIG. 1, a machine learning model such as guideline classifier 160 may contain parameter values. "Parameter values" for the purposes of this disclosure are internal variables that a machine learning model has generated from training data in order to make predictions. In one or more embodiments, parameter values may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values of the machine learning model. In one or more embodiments, in a linear regression model, parameter values may include coefficients assigned to each feature and the bias term. In one or more embodiments, in a neural network, parameter values may include weights and biases associated with the connection between neurons or nodes within layers of the network. In one or more embodiments, during pretraining and/or training of the machine learning model, parameter values of the machine learning model (e.g. guideline classifier 160) may be adjusted as a function of at least one output of the machine learning model. In one or more embodiments, processor 108 may be configured to minimize a loss function by adjusting parameter values of guideline classifier 160 based on discrepancies between outputs and feedback associated with said outputs. In one or more embodiments, training guideline classifier 160 may include adjusting one or more parameter values of guideline classifier 160 based on feedback received. In one or more embodiments, training guideline classifier 160 may include iterative training guideline classifier 160 by adjusting one or more parameter values of guideline classifier 160. In an embodiments, an individual may monitor guideline classifier 160 and provide feedback on outputs of guideline classifier 160. In one or more embodiments, feedback may be used to adjust parameter values of guidelines classifier in order to iteratively train guideline classifier 160.

With continued reference to FIG. 1, processor 108 is configured to identify a plurality of course modules 172, wherein each course module 172 is associated with at least one guideline. A "course module," as described in this disclosure, is information educating medical professionals about particular medical or health guidelines. For example, and without limitation, course module 172 may include treatment options for a particular medical illness, dosing options for a particular illness, instructions on how to treat medical patients and/or the like. In one or more embodiments, each course module 172 may educate a user, such as a medical professional, on various rules and procedures associated with a particular medical illness. In one or more embodiments, each course module 172 may be associated with one or more guidelines. A "guideline" for the purposes of this disclosure refers to a particular rule or regulation set out by a governing body. For example, and without limitation, guideline may include a particular dosing as recommended by the FDA or the American Heart Association. In one or more embodiments each guideline may indicate a particular rule or set of instructions in association with a particular medical illness. For example, and without limitation, one guideline may include rules or regulations for individuals with diabetes, while another may include rules or regulations for individuals with heart disease. In an embodiment, course modules 172 may include guidelines that are presented to medical professionals in an educational format. In one or more embodiments, each course module 172 may include guidelines for a medical illness. In one or more embodiments, each course module 172 may include a separate guideline. In one or more embodiments, each course module 172 may include guidelines categorized by guideline categorizations 156. In an embodiments, each guideline may be categorized and/or classified to one or more guideline categorizations 156.

With continued reference to FIG. 1, course modules 172 may be stored on database 116 and retrieved from database 116. In one or more embodiments, identifying course modules 172 may include retrieving course modules 172 from database 116. In one or more embodiments, identifying course modules 172 may include identifying course modules 172 classified to similar guideline categorizations 156 as regulatory data 132. In one or more embodiments, each course module 172 may be classified to one or more guideline categorizations 156. In one or more embodiments, identifying course modules 172 may include identifying course modules 172 associated with simar guideline categorizations 156 as that of regulatory data 132. In an embodiment, each segmented data 146 and/or each portion of regulatory data 132 may be associated with a particular course module 172. In one or more embodiment, course modules 172 may be initially created by a user, $3^{rd}$ party, large language model (as described in further detail below and/or the like. In one or more embodiments, each course module 172 may include a plurality of regulatory data 132 received from previous iterations of web crawler 124. In embodiment, course modules 172 may be iteratively updated to include newly received regulatory data 132 from web crawler 124.

With continued reference to FIG. 1, course modules 172 and/or system may include a virtual avatar 176. A "virtual avatar," as used in this disclosure, is an interactive character or entity in a virtual environment. In a non-limiting example, virtual avatar 176 may include a virtual representation of an individual in a virtual environment. In an embodiment, a virtual avatar 176 may be customizable. Virtual avatar 176 may include, without limitation, an animal, human, robot, inanimate object, and the like, and may include one or more personalized characteristics, wherein personalized characteristics may be programmed by an individual tasked with operating system 100. In a non-limiting example, virtual environment may include an extended reality space, such as, without limitation, augmented reality (AR) space, virtual reality (VR) space, and/or any other digital realities. For example, and without limitation, extended reality space may include a virtual classroom, virtual meeting room, virtual study room, and the like thereof. In one or more embodiments, virtual avatar 176 may include a virtual representation of a living being and/or inanimate object capable of conveying speech. In one or more mor embodiments, virtual avatar 176 may convey information within course module 172 to a medical professional. In one or more embodiments, virtual avatar 176 may be configured to convey information within course modules 172 in the form of speech. In one or more embodiments, virtual avatars 176 may mimic teachers and/or other educational professional and convey over guidelines to users. In one or more embodiments, virtual avatar 176 may include prewritten instructions to convey any information within course module 172. In one or more embodiments, virtual avatar 176 may include one or more text to speech algorithms in order to convey textual data within course modules 172 in a vocal format. In one or more embodiments virtual avatar 176 may be programmed by a user to receive any new information or changes in information within course module 172 and convey the information in a vocal or virtual format. In one or more embodiments, virtual avatar 176 may be programmed to interact with a user (e.g. a medical professional seeking educational content) of system and convey over information within course modules 172. In one or more embodiments, virtual avatar 176 may include a chatbot system as described in reference to at least FIG. 2. In one or more embodiments, virtual avatar 176 and/or chatbot system may be communicatively connected to a large language model, wherein the virtual avatar 176 is configured to receive questions or follow up questions from the user and utilize the large language model to generate response. For example, and without limitation, a user may respond with "can you define this word or explain it more simply" wherein virtual avatar 176 may transmit the interaction to LLM 180, receive an output from the LLM 180 and convey the output to the user through the virtual avatar 176. In one or more embodiments, system 100 may include virtual avatar 176 wherein course modules 172 are conveyed and/or output through virtual avatar 176.

With continued reference to FIG. 1, course modules 172 may include interactive one or more interactive elements. An "interactive element" for the purposes of this disclosure is an element within a graphical user interface that allows for interaction with system by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on a graphical user interface, wherein the selection of a particular push button may result in a particular function. In one or more embodiments, interactive elements may include words, phrases, illustrations and the like to indicate the particular process the user would like system to perform. In one or more embodiments, course modules 172 may include questions and answers, wherein questions may b presented through a graphical user interface, and a user may utilize interactive element to answer the questions. In one or more embodiments, course module 172 may include tests and/or questions presented to a user following the conveyance of information in order to test user on the information that was received. In one or more embodiments, interactive elements may allow for users to select or input answers to questions received. In one or more embodiments, each question may be associated with a particular guidelines wherein answers to the wrong questions may prompt processor 108 to re-convey the particular guideline to user.

With continued reference to FIG. 1, processor 108 is configured to match regulatory and/or portions thereof to one or more course modules 172 as a function of the classification of regulatory data 132 to one or more guideline categorizations 156. In an embodiment, each course module 172 may be classified to one or more guideline categorizations 156, wherein regulatory data 132 classified to the same or similar guideline categorization 156 may be matched to the corresponding course module 172. In one or more embodiments, processor 108 may classify regulatory data 132 and match regulatory data 132 to the corresponding course module 172 within the same guideline categorization 156. In one or more embodiment, portions of regulatory data 132 as defined by content breaks 144 may be matched to corresponding course modules 172. In one or mor embodiments, each segmented data 146 may be classified to a particular course module 172. In an embodiments, matching may allow for data associated with a particular course module 172 to be appended to the course module 172.

With continued reference to FIG. 1, processor 108 is configured to modify course modules 172 as a function of regulatory data 132. In one or more embodiments, modification may include appending regulatory data 132, portions of regulatory data 132 and/or segmented data 146 to course modules 172. In one or more embodiment, course modules 172 may be updated with regulatory data 132. In one or more embodiments, regulatory data 132 may include information that contradicts information within course modules 172. In one or more embodiments contradictory information within course modules 172 may be removed and replaced with the most recent regulatory data 132. In one or more embodiments, guidelines with respect to treatment, patient care and the like may be continuously updated wherein information within course module 172 may require removal and/or replacement. In one or more embodiments, information within course module 172 may be modified wherein regulatory data 132 may be added to each course module 172. In one or mor embodiments, regulatory data 132 may be transmitted to a large language model, wherein the large language model may be configured to output information suitable for use in course module 172. In one or more embodiments, large language model may be configured to paraphrase information within regulatory data 132 and output information in a format that is more suitable for understanding by medical professionals. In one or more embodiments, course modules 172 may include educational courses wherein large language model may be configured to modify regulatory data 132 to provide regulatory data 132 in an education format. This may include the use of commonly understood language or words, the generation of quizzes, tests and/or the like. In one or more embodiments course modules 172 may be modified into modified course modules 184.

Still referring to FIG. 1, system 100 may include and/or be communicatively connected to a large language model (LLM 180). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, information from regulatory agencies, and the like. In some embodiments, training sets of an LLM 180 may include information from one or more public or private databases. As a non-limiting example, training sets may include databases associated with an entity. In some embodiments, training sets may include portions of documents associated with the electronic records correlated to examples of outputs. In an embodiment, an LLM 180 may include one or more architectures based on capability requirements of an LLM 180. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM 180 may be generally trained. As used in this disclosure, a "generally trained" LLM 180 is an LLM 180 that is trained on a general training set comprising a variety of subject matters, data sets, and fields. In some embodiments, an LLM 180 may be initially generally trained. Additionally, or alternatively, an LLM 180 may be specifically trained. As used in this disclosure, a "specifically trained" LLM 180 is an LLM 180 that is trained on a specific training set, wherein the specific training set includes data including specific correlations for the LLM 180 to learn. As a non-limiting example, an LLM 180 may be generally trained on a general training set, then specifically trained on a specific training set. In an embodiment, specific training of an LLM 180 may be performed using a supervised machine learning process. In some embodiments, generally training an LLM 180 may be performed using an unsupervised machine learning process. As a non-limiting example, specific training set may include information from a database 116. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM 180 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM 180 may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM 180 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM

180 may include a text prediction based algorithm configured to receive an article and apply a probability distribution to the words already typed in a sentence to work out the most likely word to come next in augmented articles. For example, if some words that have already been typed are "patient may", then it may be highly likely that the word "exhibit" will come next. An LLM 180 may output such predictions by ranking words by likelihood or a prompt parameter. For the example given above, an LLM 180 may score "you" as the most likely, "your" as the next most likely, "his" or "her" next, and the like. An LLM 180 may include an encoder component and a decoder component.

Still referring to FIG. 1, an LLM 180 may include a transformer architecture. In some embodiments, encoder component of an LLM 180 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM 180 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM 180 may predict the next word by searching for a set of positions in a source sentence where the most relevant information is concentrated. An LLM 180 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM 180, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM 180 may pick up particular parts at different positions in the input sequence and over time compute an initial composition of the output sequence. In multi-head attention, an LLM 180 may include a transformer model of an attention mechanism. Attention mechanisms, as described above, may provide context for any position in the input sequence. For example, if the input data is a natural language sentence, the transformer does not have to process one word at a time. In multi-head attention, computations by an LLM 180 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM 180 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM 180 may either attend to all source words or predict the target sentence, thereby attending to a smaller subset of words.

With continued reference to FIG. 1, multi-headed attention in encoder may apply a specific attention mechanism called self-attention. Self-attention allows models such as an LLM 180 or components thereof to associate each word in the input, to other words. As a non-limiting example, an LLM 180 may learn to associate the word "you", with "how" and "are". It's also possible that an LLM 180 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM 180 to learn to extract and focus on different combinations of attention from its attention heads.

With continued reference to FIG. 1, an LLM 180 may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with regulatory data 132 and/or course modules 172 and outputs may include modified course modules 184.

With continued reference to FIG. 1, an LLM 180 may generate at least one annotation as an output. At least one annotation may be any annotation as described herein. In some embodiments, an LLM 180 may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, LLM 180 may be configured to receive regulatory data 132 and output course modules 172. In one or more embodiments, LLM 180 may be configured to receive regulatory data 132 and output information that may be appended to their respective course modules 172. In one or more embodiments, processor 108 may be configured to transmit regulatory data 132 to LLM 180 and receive from LLM 180 information that may be used within course moules. In one or more embodiments, LLM 180 may receive regulatory data 132 and output code and/or instructions for virtual avatar 176 to convey regulatory data 132 in an educational format. In one or more embodiments, LLM 180 may be configured to break up the regulatory data 132 into differing guidelines. In one or more embodiments, LLM 180 may be configured to combine various portions of regulatory data 132 that are similar in order to create educational content for an individual. In one or more embodiments, LLM 180 may be configured to receive regulatory data 132 and output content such as question and answers, interactive questions and/or a format in which regulatory data 132 may be conveyed in a dialogue similar to that of an educational instructor. In one or more embodiments, LLM 180 may be configured to remove dialogue or words typically used by regulatory agencies and replace them with words commonly known amongst medical professionals.

With continued reference to FIG. 1, LLM 180 may be configured to receive regulatory data 132 and corresponding course modules 172 and output modified course modules 184. In one or more embodiments, modified course modules 184 include course modules 172 that have been modified to include regulatory data 132. In one or more embodiments, processor 108 may be configured to transmit the regulatory data 132 and the one or more course modules 172 to a large language model (LLM 180) communicatively connected to processor 108. In one or more embodiments, processor 108 may then be configured to receive modified course modules 184. In one or more embodiments, the LLM 180 is configured to receive the regulatory data 132 and the one or more course modules 172 and output the modified course modules 184. In one or more embodiments, modified course modules 184 may include course modules 172 with added regulatory data 132. In one or more embodiments, LLM 180 may be configured to determine if any information with course modules 172 and regulatory data 132 contradict wherein LLM 180 may be configured to remove contradictory information and replace it with information from within regulatory data 132. In one or more embodiments, LLM 180 may be configured to identify portions of course modules 172 and identify portions of regulatory data 132 and add regulatory data 132 to their respective place within course modules 172. For example, and without limitation, dosing regulations within regulatory data 132 may be added to sections of course module 172 describing dosing, whereas treatment options within regulatory data 132 may be added to sections of course modules 172 describing treatment options. In one or more embodiments, LLM 180 may be configured to generate instruction and/or code for virtual avatar 176 to convey the new information within modified course modules 184. In one or more embodiments, modified course modules 184 may include information indicating changes to course modules 172 based on newly received regulatory data 132. For example, and without limitation regulatory data 132 may indicate a particular treatment that contradicts a previously agreed upon treatment. As a result, modified course module 184 may indicate that recently received regulatory data 132 treatment has changed from one treatment to another. In one or more embodiments, LLM 180 may be configured to modify existing questions and answers and/or add additional questions and answers to course modules 172 based on newly received regulatory data 132.

With continued reference to FIG. 1, virtual avatar 176 may be communicatively connected to LLM 180 wherein virtual avatar 176 may allow for interaction between a user and virtual avatar 176. In one or more embodiments, virtual avatar 176 may educate a user based on information within course modules 172, wherein communications or questions associated with the course modules 172 may be transmitted to LLM 180 and conveyed back to user. In one or more embodiments, virtual avatar 176 may simulate a human instructor in which a user may ask questions, ask for clarity and/or the like.

With continued reference to FIG. 1, processor 108 may receive modified course modules 184 and update database 116 with modified course modules 184. In one or more embodiments, modified course modules 184 may replace existing course modules 172.

With continued reference to FIG. 1, processor 108 may be configured to transmit a notification 192 associated with one or more course modules 172 to an end user 188 in response to modification of course modules 172. A "notification" as described in this disclosure refers to a communication made in response to an action taken by a person or software. For example, without limitation notification 192 may indicate that individuals have interacted with course modules 172. In one or more embodiments, notification 192 may include information indicating that changes have been made to course modules 172. In one or more embodiments, end user 188 may be put on notice that modifications have been made to course modules 172. An "end user" for the purposes of this disclosure refers to an individual or remote device to which a system is communicating. In one or embodiments, end user 188 may include a technician seeking to ensure that modifications to course modules 172 are accurate. In one or more embodiments, end user 188 may include medical professionals that have previously interacted with system 100. In one or more embodiments, notification 192 may indicate that changes have been made to a specific course module 172. In one or more embodiments, notifications 192 may put individuals on notice that regulations may have changed since they last interacted with a course modules 172. In one or mor embodiments, notification 192 may include specific changes made to course modules 172. In one or more embodiments, LLM 180 may be configured to generate notifications 192 wherein notifications 192 may include summaries or bullet points of changes made. In one or more embodiments, processor 108 may be configured to transmit notification 192 to end user 188 to inform end users 188 that recent regulations have been identified. In one or more embodiments, processor 108 may be configured to transmit notification 192 in response to course module 172 notifications 192.

In one or more embodiments, end users 188 may access database 116 to retrieve course modules 172. In one or more embodiments, course modules 172 may be presented to end user 188 through use of virtual avatar 176. In one or more embodiments, avatar may be located on server 120 wherein interactions with avatar may be communicated to LLM 180 and transmitted to users.

Figure 2:
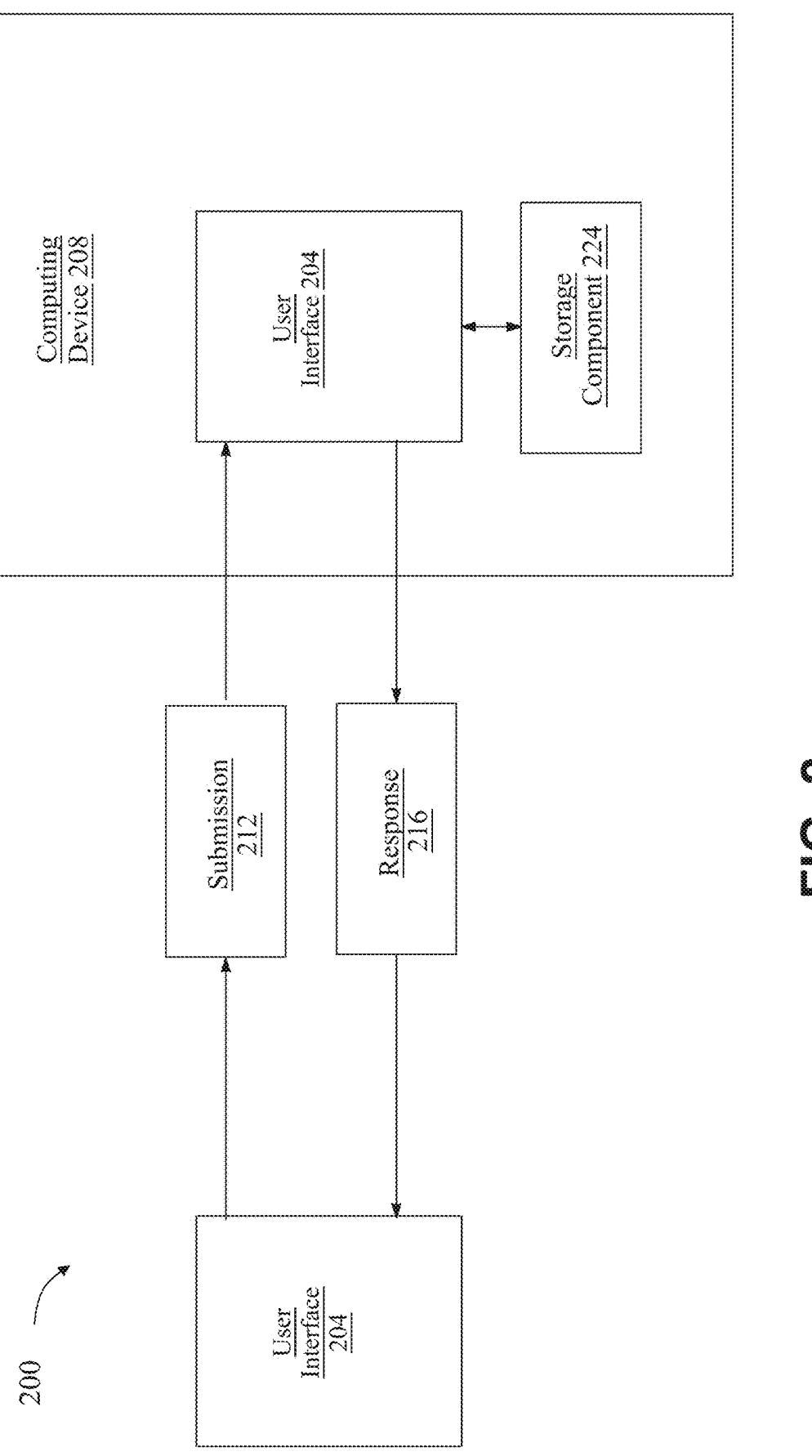
FIG. 2 is a block diagram of exemplary embodiment of a chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 204 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor. In some embodiments, processor processes a submission 212 using one or more of keyword recognition, pattern matching, and natural language processing. In some embodiments, processor employs real-time learning with evolutionary algorithms. In some cases, processor may retrieve a pre-prepared response from at least a storage component 224, based upon submission 212. Alternatively or additionally, in some embodiments, processor communicates a response 216 without first receiving a submission 212, thereby initiating conversation. In some cases, processor communicates an inquiry to user interface 204; and the processor is configured to process an answer to the inquiry in a following submission 212 from the user interface 204. In some cases, an answer to an inquiry present within a submission 212 from a user device may be used by computing device 104 as an input to another function, for example without limitation as an input to LLM and/or an input to course module.

Figure 3:
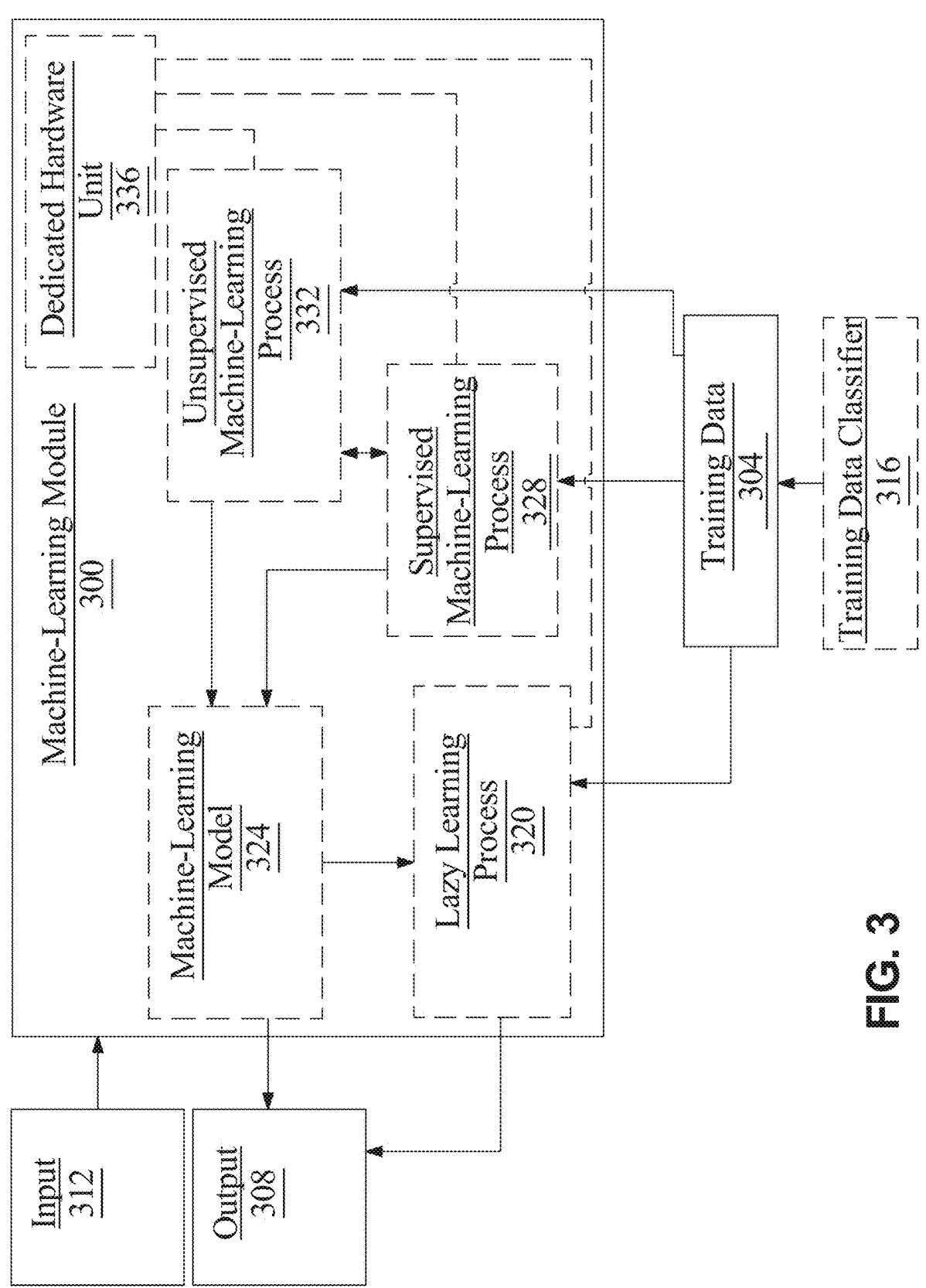
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such a regulatory data and outputs may include outputs such as guideline classifications.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classes of guidelines, classes of mental illnesses, classes of regulations, specific medical fields and/or the like.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include regulatory as described above as inputs, guideline classifications outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
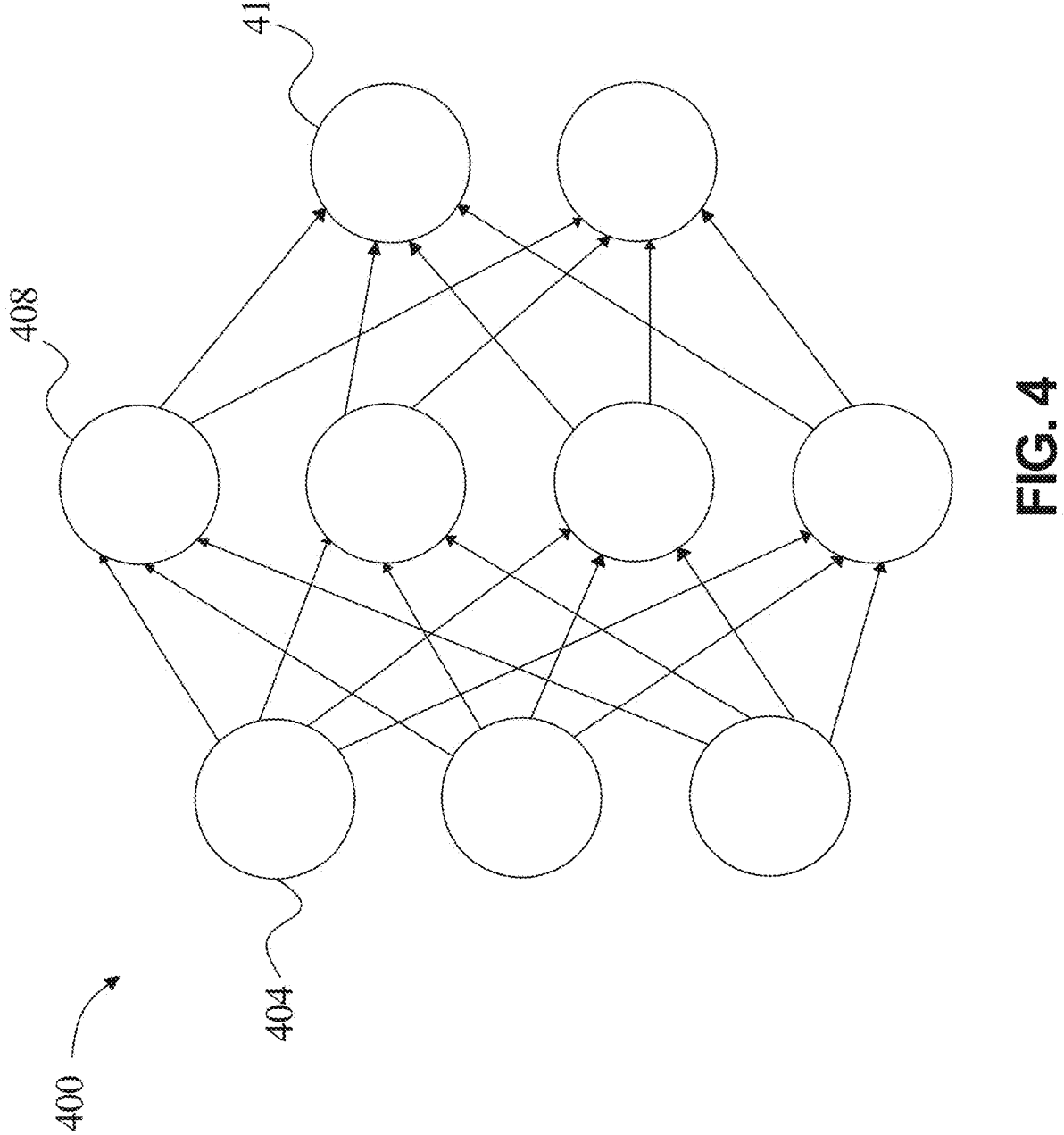
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
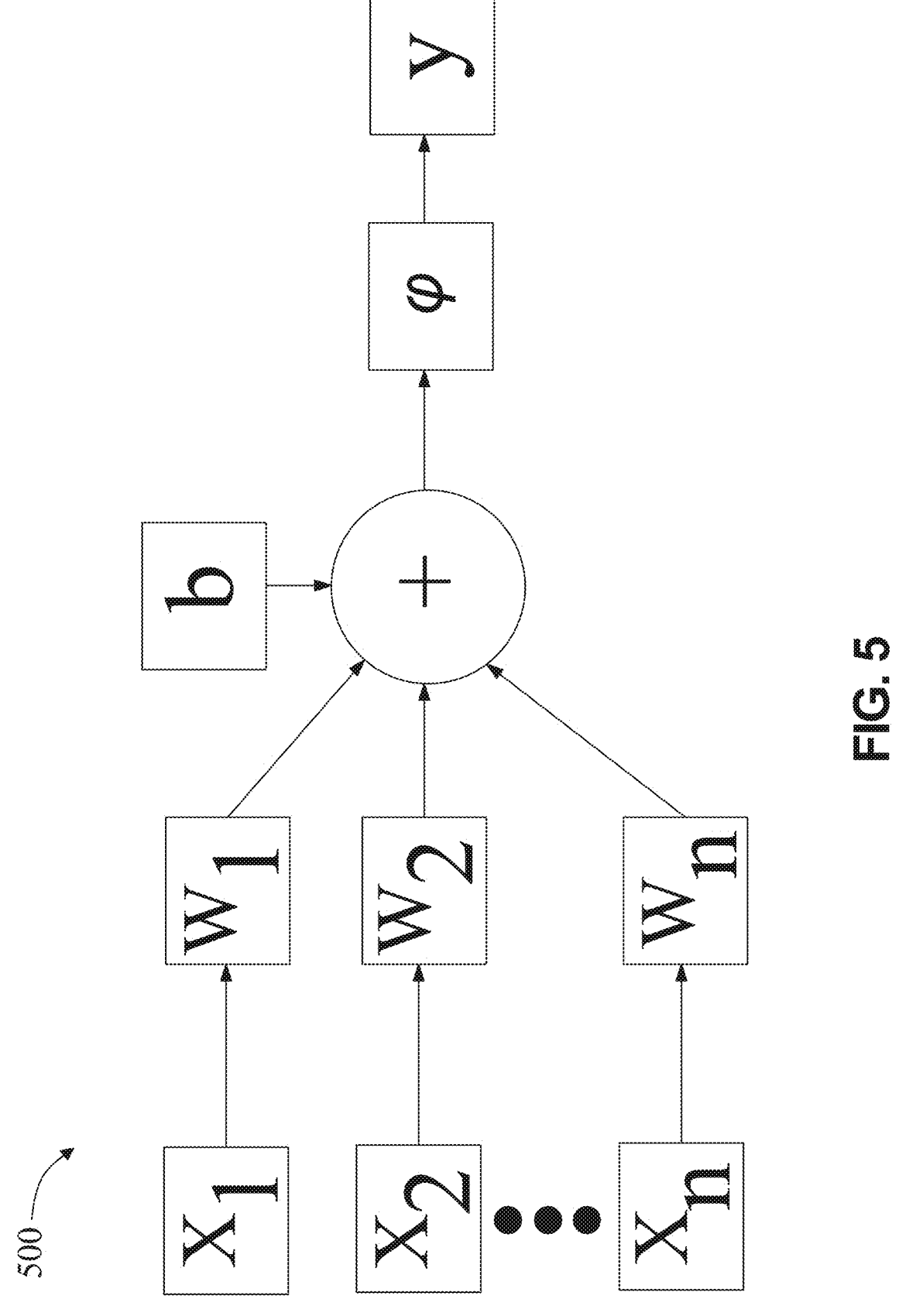
FIG. 5 is a block diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
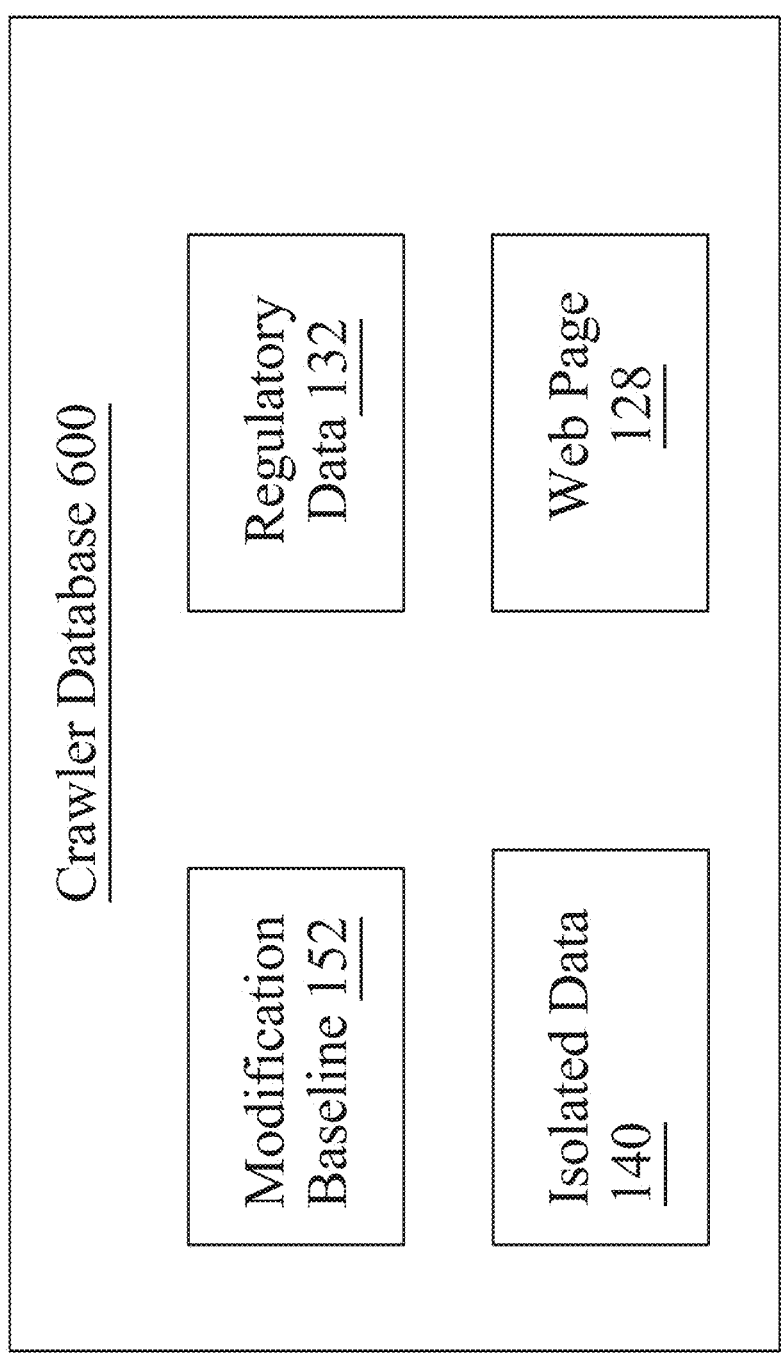
FIG. 6 is an exemplary embodiment of a crawler database.

Referring now to FIG. 6, an exemplary embodiment of a crawler database 600 is described. In one or more embodiments, crawler database 600 may be configured to receive and store information received from a web crawler such as any web crawler as described in this disclosure. In one or more embodiments, crawler database 600 may include any server as described in this disclosure. In one or more embodiments, web crawler may be configured to retrieve isolated data 140 wherein isolated data 140 may be stored on crawler database 600. In one or more embodiments, web pages 128 and/or screenshots thereof may be stored on crawler database as well. In one or more embodiments, modification baselines 152 may be stored on crawler database 600 wherein isolated data 140 may be compared to modification baselines 152 to determine what information is new and what information has been previously scraped by web crawler. In one or more embodiments, modification baseline 152 may be iteratively updated in order to include new information received by web crawler wherein modification baseline 152 may be used and/or updated for future iterations. In one or more embodiments, new information may be received by crawler database as a function of a similarity and/or distance metric as described in reference to FIG. 1. In one or more embodiments, crawler database 600 may include database 116 as described in reference to FIG. 1. In one or more embodiments, database may be configured to generate regulatory data 132.

Referring now to FIG. 7, a method 700 for dynamically updating data for course generation is described. At step 705, method 700 includes identifying, by a web crawler operating on a server, one or more predetermined HTML elements on a plurality of web pages. In one or more embodiments, identifying, by the web crawler, the one or more predetermined HTML elements on the plurality of web pages includes transmitting a conditional request to the plurality of web pages, receiving a response from each web page of the plurality of web pages as a function of the conditional request, wherein each response comprises a modification state of each web page and identifying the one or more predetermined HTML elements with the response of each web page.

With continued reference to FIG. 7, at step 710 method 700 includes identifying, by the web crawler, isolated data as a function of the one or more predetermined HTML elements.

With continued reference to FIG. 7, at step 715 method 700 includes comparing, by the web crawler, the isolated data to a modification baseline. In one or more embodiments, comparing, by the web crawler, the isolated data to the modification baseline includes encoding, using an encoder, the isolated data, comparing the encoded isolated data to the modification baseline by identifying a distance metric and identifying one or more redundant elements within the encoded isolated data as a function of the distance metric. In one or more embodiments, the modification baselines includes previous isolated data received from a preceding crawl of the web crawler. In one or more embodiments, comparing, by the web crawler, the isolated data to the modification baseline includes identifying one or more content breaks within the isolated data, segmenting the isolated data into a plurality of segmented data as a function of the content breaks, encoding each of the plurality of segmented data and comparing the plurality of encoded segmented data to the modification baseline. In one or more embodiments, method 700 may further include appending, by the web crawler the plurality of encoded segmented data to the modification baseline.

With continued reference to FIG. 7, at step 720 method 700 includes generating, by the web crawler, regulatory data as a function of the isolated data and the comparison. In one or more embodiments, generating, by the crawler, the regulatory data as a function of the isolated data and the comparison includes generating the regulatory data as function of the isolated data and the one or more redundant elements.

With continued reference to FIG. 7, at step 725 method 700 includes generating, by the web crawler, regulatory data as a function of the isolated data and the comparison. In one or more embodiments, method 700 further includes outputting, by the at least a processor, the one or more course modules through a virtual avatar.

With continued reference to FIG. 7, at step 730 method 700 includes receiving, by at least a processor, the regulatory data.

With continued reference to FIG. 7, at step 735 method 700 includes classifying, by the at least a processor, the regulatory data to one or more guideline categorizations. In one or more embodiments, classifying, by the at least a processor, the regulatory data to the one or more guideline categorizations includes receiving guideline training data comprising a plurality of regulatory data correlated to a plurality of guideline categorizations, training a guideline classifier as a function of the guideline training data and classifying the regulatory data the one or more guideline categorizations as a function of the trained guideline classifier. In one or more embodiments, training the guideline classifier includes iteratively training the guideline classifier by adjusting one or more parameter values of the guideline classifier.

With continued reference to FIG. 7, at step 740 method 700 includes matching, by the at least a processor, the regulatory data to one or more course modules as a function of the classification.

With continued reference to FIG. 7, at step 745 method 700 includes modifying, by the at least a processor, the one or more course modules as a function of the regulatory data. In one or more embodiments, modifying, by the at least a processor, the one or more course modules as a function of the matching includes transmitting the regulatory data and the one or more course modules to a large language model (LLM) communicatively connected to the at least a processor and receiving from the LLM, the modified course modules, wherein the LLM is configured to receive the regulatory data and the one or more course modules and output the modified course modules.

With continued reference to FIG. 7, at step 750 method 700 includes transmitting, by the at least a processor, a notification associated with the one or more modified course modules to an end user in response to the modification It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
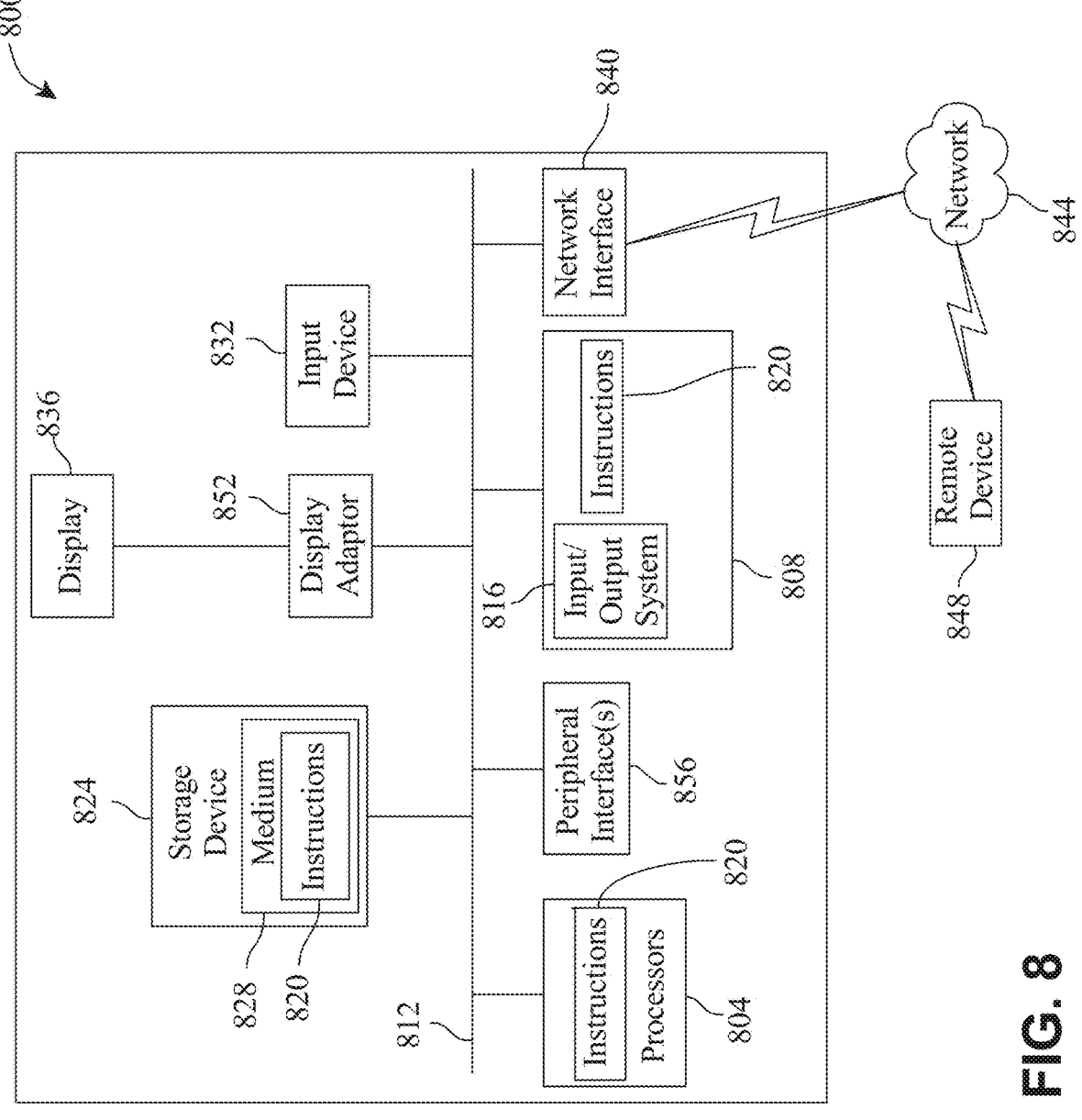
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dynamically updating data for course generation, the system comprising:

a web crawler operating on a server, wherein the web crawler is configured to:

identify one or more predetermined HTML elements on a plurality of web pages;

identify isolated data as a function of the one or more predetermined HTML elements;

compare the isolated data to a modification baseline which comprises:

encoding, using an encoder, the isolated data;

comparing the encoded isolated data to the modification baseline by identifying a distance metric wherein the encoded isolated data is represented as vectors and identifying the distance metric comprises identifying a cosine similarity between the isolated data and the modification baseline; and identifying one or more redundant elements within the encoded isolated data as a function of the distance metric; and generate regulatory data as a function of the isolated data and the comparison which comprises generating the regulatory data as a function of the isolated data and the one or more redundant elements;

at least a processor; and a memory communicatively connected to the at least a processor, the memory containing instructions configuring the at least a processor to:

receive the regulatory data;

sanitize guideline training data, which comprises a plurality of regulatory data correlated to a plurality of guideline categorizations, to limit noise by:

determining that at least one training data entry of the guideline training data has a signal to noise ratio below a threshold; and removing the at least one training data entry from the guideline training data to create sanitized guideline training data:

classify the regulatory data to one or more guideline categorizations by:

training a guideline classifier as a function of the sanitized guideline training data until the guideline classifier satisfies a convergence test, wherein sanitizing of the guideline training data accelerates convergence of the guideline classifier; and classifying the regulatory data to the one or more guideline categorizations using the trained guideline classifier;

identify a plurality of course modules, wherein each course module is associated with at least one guideline;

match the regulatory data to one or more course modules as a function of the one or more guideline categorizations;

modify the one or more course modules as a function of the regulatory data; and transmit a notification associated with the one or more modified course modules to an end user.

2. The system of claim 1, wherein modifying the one or more course modules as a function of the regulatory data comprises:

transmitting the regulatory data and the one or more course modules to a large language model (LLM) communicatively connected to the at least a processor; and receiving from the LLM, the one or more modified course modules, wherein the LLM is configured to receive the regulatory data and the one or more course modules and output the modified course modules.

3. The system of claim 1, the system further comprising a virtual avatar, the virtual avatar configured to output the one or more course modules.

4. The system of claim 1, wherein the modification baseline comprises previous isolated data received from a preceding crawl of the web crawler.

5. The system of claim 1, wherein training the guideline classifier comprises iteratively training the guideline classifier by adjusting one or more parameter values of the guideline classifier.

6. The system of claim 1, wherein comparing the isolated data to the modification baseline comprises:

identifying one or more content breaks within the isolated data;

segmenting the isolated data into a plurality of segmented data as a function of the content breaks;

encoding each of the plurality of segmented data; and comparing the plurality of encoded, segmented data to the modification baseline.

7. The system of claim 6, wherein the web crawler is further configured to append the plurality of encoded segmented data to the modification baseline as a function of the comparison.

8. The system of claim 1, wherein identifying the one or more predetermined HTML elements on the plurality of web pages comprises:

transmitting a conditional request to the plurality of web pages;

receiving a response from each web page of the plurality of web pages as a function of the conditional request, wherein each response comprises a modification state of each web page; and identifying the one or more predetermined HTML elements with the response of each web page.

9. A method for dynamically updating data for course generation, the method comprising:

identifying, by a web crawler operating on a server, one or more predetermined HTML elements on a plurality of web pages;

identifying, by the web crawler, isolated data as a function of the one or more predetermined HTML elements;

comparing, by the web crawler, the isolated data to a modification baseline which comprises:

encoding, using an encoder, the isolated data;

comparing the encoded isolated data to the modification baseline by identifying a distance metric wherein the encoded isolated data is represented as vectors and identifying the distance metric comprises identifying a cosine similarity between the isolated data and the modification baseline; and identifying one or more redundant elements within the encoded isolated data as a function of the distance metric;

generating, by the web crawler, regulatory data as a function of the isolated data and the comparison which comprises generating the regulatory data as a function of the isolated data and the one or more redundant elements;

receiving, by at least a processor, the regulatory data;

sanitizing, by the at least a processor, guideline training data, which comprises a plurality of regulatory data correlated to a plurality of guideline categorizations, to limit noise by:

determining that at least one training data entry of the guideline training data has a signal to noise ratio below a threshold; and removing the at least one training data entry from the guideline training data to create sanitized guideline training data:

classifying, by the at least a processor, the regulatory data to one or more guideline categorizations by:

training a guideline classifier as a function of the sanitized guideline training data until the guideline classifier satisfies a convergence test, wherein sanitizing of the guideline training data accelerates convergence of the guideline classifier; and classifying the regulatory data to the one or more guideline categorizations using the trained guideline classifier;

identifying, by the at least a processor, a plurality of course modules, wherein each course module is associated with at least one guideline;

matching, by the at least a processor, the regulatory data to one or more course modules as a function of the one or more guideline categorizations;

modifying, by the at least a processor, the one or more course modules as a function of the regulatory data; and transmitting, by the at least a processor, a notification associated with the one or more modified course modules to an end user.

10. The method of claim 9, wherein modifying, by the at least a processor, the one or more course modules as a function of the regulatory data comprises:

transmitting the regulatory data and the one or more course modules to a large language model (LLM) communicatively connected to the at least a processor; and receiving from the LLM, the modified course modules, wherein the LLM is configured to receive the regulatory data and the one or more course modules and output the modified course modules.

11. The method of claim 9, the method further comprising, outputting, by the at least a processor, the one or more course modules through a virtual avatar.

12. The method of claim 9, wherein the modification baselines comprises previous isolated data received from a preceding crawl of the web crawler.

13. The method of claim 9, wherein training the guideline classifier comprises iteratively training the guideline classifier by adjusting one or more parameter values of the guideline classifier.

14. The method of claim 9, wherein comparing, by the web crawler, the isolated data to the modification baseline comprises:

identifying one or more content breaks within the isolated data;

segmenting the isolated data into a plurality of segmented data as a function of the content breaks;

encoding each of the plurality of segmented data; and comparing the plurality of encoded segmented data to the modification baseline.

15. The method of claim 14, the method further comprising appending, by the web crawler the plurality of encoded segmented data to the modification baseline as a function of the comparison.

16. The method of claim 9, wherein identifying, by the web crawler, the one or more predetermined HTML elements on the plurality of web pages comprises:

transmitting a conditional request to the plurality of web pages;

receiving a response from each web page of the plurality of web pages as a function of the conditional request, wherein each response comprises a modification state of each web page; and identifying the one or more predetermined HTML elements with the response of each web page.

* * * * *